(12) United States Patent
Klop et al.

(10) Patent No.: US 11,072,378 B2
(45) Date of Patent: Jul. 27, 2021

(54) ACTIVE AIR DAM

(71) Applicant: FORD GLOBAL TECHNOLOGIES, LLC, Dearborn, MI (US)

(72) Inventors: Aaron Peter Klop, Bloomfield Hills, MI (US); Kyle Ness, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 916 days.

(21) Appl. No.: 15/073,835

(22) Filed: Mar. 18, 2016

(65) Prior Publication Data

US 2017/0267294 A1  Sep. 21, 2017

(51) Int. Cl.
*B62D 35/00* (2006.01)
*B62D 37/02* (2006.01)

(52) U.S. Cl.
CPC .......... *B62D 35/005* (2013.01); *B62D 37/02* (2013.01); *Y02T 10/82* (2013.01)

(58) Field of Classification Search
CPC .............................. B62D 35/005; B62D 37/02
See application file for complete search history.

(56) References Cited

U.S. PATENT DOCUMENTS

| 4,457,558 | A | * | 7/1984 | Ishikawa | B60K 11/085 |
| | | | | | 123/41.05 |
| 4,659,130 | A | * | 4/1987 | Dimora | B62D 35/005 |
| | | | | | 293/118 |
| 4,758,037 | A | * | 7/1988 | Suzuki | B62D 35/005 |
| | | | | | 296/180.1 |
| 4,770,457 | A | | 9/1988 | Tomforde | |
| 4,778,212 | A | * | 10/1988 | Tomforde | B62D 35/005 |
| | | | | | 180/903 |
| 4,810,022 | A | * | 3/1989 | Takagi | B62D 35/005 |
| | | | | | 180/197 |
| 6,079,769 | A | | 6/2000 | Fannin et al. | |
| 6,089,628 | A | * | 7/2000 | Schuster | B60R 19/12 |
| | | | | | 293/118 |
| 6,209,947 | B1 | * | 4/2001 | Rundels | B62D 35/005 |
| | | | | | 180/903 |
| 7,178,859 | B2 | | 2/2007 | Browne et al. | |
| 7,686,383 | B2 | | 3/2010 | Tortosa-Boonacker | |
| 7,780,223 | B2 | | 8/2010 | Kottenstette et al. | |
| 8,292,350 | B2 | * | 10/2012 | Li | B62D 35/005 |
| | | | | | 296/180.1 |

(Continued)

FOREIGN PATENT DOCUMENTS

| DE | 3145258 A1 * | 5/1983 | ........... B62D 35/005 |
| FR | 2626544 A1 * | 8/1989 | ........... B62D 35/005 |

(Continued)

*Primary Examiner* — Lori L Lyjak
(74) *Attorney, Agent, or Firm* — David Coppiellie; King & Schickli, PLLC

(57) ABSTRACT

An air deflector assembly for a vehicle includes a vertically translatable air deflector and linear actuators actuated in series by a driver to vertically translate the air deflector. The air deflector includes one or more rails configured for sliding translation within one or more cooperating vehicle-mounted tracks. A controller is operatively connected to the driver, and may be configured to vertically translate the air deflector to a predetermined position according to a vehicle rate of travel. The driver selectively causes the linear actuators to raise or lower the air deflector.

10 Claims, 7 Drawing Sheets

(56) References Cited

U.S. PATENT DOCUMENTS

| | | | | |
|---|---|---|---|---|
| 8,646,552 | B2* | 2/2014 | Evans | B60K 11/085 |
| | | | | 180/68.1 |
| 8,702,152 | B1* | 4/2014 | Platto | B62D 35/005 |
| | | | | 296/180.1 |
| 9,102,366 | B1* | 8/2015 | Kim | B62D 35/005 |
| 9,469,354 | B1* | 10/2016 | Ciccone | B62D 35/005 |
| 9,783,153 | B2* | 10/2017 | Farooq | B60R 19/023 |
| 2008/0303309 | A1 | 12/2008 | Dayton | |
| 2012/0001450 | A1* | 1/2012 | Li | B62D 35/007 |
| | | | | 296/180.1 |
| 2012/0330513 | A1* | 12/2012 | Charnesky | B62D 35/005 |
| | | | | 701/48 |
| 2014/0076645 | A1* | 3/2014 | McDonald | B62D 35/005 |
| | | | | 180/68.1 |
| 2016/0229467 | A1* | 8/2016 | Miller | B62D 35/005 |
| 2017/0088193 | A1* | 3/2017 | Heil | B62D 35/00 |
| 2017/0101136 | A1* | 4/2017 | Zielinski | B62D 35/005 |
| 2017/0120967 | A1* | 5/2017 | Yoon | B62D 35/005 |

FOREIGN PATENT DOCUMENTS

| | | | | |
|---|---|---|---|---|
| FR | 2698446 | A1 * | 5/1994 | B62D 35/005 |
| WO | 2006052447 | A2 | 5/2006 | |
| WO | 2015124281 | A1 | 8/2015 | |

* cited by examiner

ACTIVE AIR DAM

TECHNICAL FIELD

This disclosure relates generally to airflow control for motor vehicles. In particular, the disclosure relates to an airflow control assembly for controlling deployment of an air deflector.

BACKGROUND

As the speed at which a motor vehicle travels increases, because of differences in airspeed and pressure generated underneath the vehicle chassis relative to the top of the vehicle, lift is generated and contact of the vehicle wheels with the road surface decreases slightly. This can affect handling and stability, particularly for vehicles being operated at higher speeds. To address this problem it is known to provide aerodynamic air deflectors or "air dams" for motor vehicles, to assist in managing airflow passing beneath the vehicle. By use of such air deflectors, motor vehicle fuel efficiency can be improved. Likewise, air deflectors assist in limiting motor vehicle lift. For example, vehicle front air dams limit motor vehicle front end lift by creating a downforce, forcing the vehicle nose down and so improving vehicle handling and stability. Still more, properly designed front air dams may assist in engine cooling and therefore efficiency. Other air deflectors such as spoilers can provide a similar effect, for example by creating a down force near a vehicle rear end to improve rear wheel contact with a road surface.

Of necessity, air deflectors extending below the motor vehicle chassis reduce ground clearance. This may be of little import when the vehicle is traveling on a smooth road. However, when the vehicle is travelling on a rough road, excessive reduction in ground clearance may result in vehicle damage and potentially a loss of stability and handling. For example, even if the vehicle does not actually strike an obstacle in the road, sudden braking or steering may cause the vehicle nose to dip or roll, in turn causing a portion of a front air dam to strike the road surface and cause damage and potential impairment of vehicle stability and handling. Moreover, at lower speeds the air deflector may not be needed to improve fuel efficiency and handling, and retraction of the air deflector may be desirable.

To solve this and other problems, the present disclosure relates to a compact and efficient system for deploying and retracting a motor vehicle air deflector.

SUMMARY

In accordance with the purposes and benefits described herein, in one aspect of the disclosure an airflow control assembly for a vehicle is described, comprising a vertically translatable air deflector and a plurality of linear actuators actuated in series by a driver to vertically translate the air deflector. The air deflector comprises one or more rails configured for sliding translation within one or more cooperating vehicle-mounted tracks. In embodiments, the one or more rails are configured as T-channel sliders and the cooperating tracks define corresponding female receivers. A controller may be operatively connected to the driver. In embodiments, the driver may be a fluid driver.

In embodiments, the controller comprises logic including executable instructions to cause vertical translation of the air deflector to a predetermined position according to a vehicle rate of travel. In embodiments, the driver is a hydraulic pump which may be reversibly operated to selectively cause the plurality of linear actuators to raise or lower the air deflector. In embodiments, each of the plurality of linear actuators is a hydraulic piston, the plurality of linear actuators in combination with the hydraulic pump defining an hydraulic circuit.

In the following description, there are shown and described embodiments of the disclosed air deflector assembly and of an airflow control system. As it should be realized, the devices and systems are capable of other, different embodiments and their several details are capable of modification in various, obvious aspects all without departing from the devices as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed air deflector assembly, and together with the description serve to explain certain principles thereof. In the drawings.

Reference will now be made in detail to embodiments of the disclosed air deflector assembly and airflow control system, examples of which are illustrated in the accompanying drawing figures.

DETAILED DESCRIPTION

Preliminarily, the present disclosure describes a vehicle air deflector primarily in the context of a front-mounted air deflector for altering air flow beneath/around a vehicle chassis, specifically a front air dam. However, the skilled artisan will appreciate that the disclosed systems and devices are readily adaptable to other types of vehicle air deflector, including without intending any limitation fender flares, side skirt cribs, top and/or rear spoilers, and others. Application of the presently described devices and systems to all such embodiments is contemplated herein.

Figure 1:
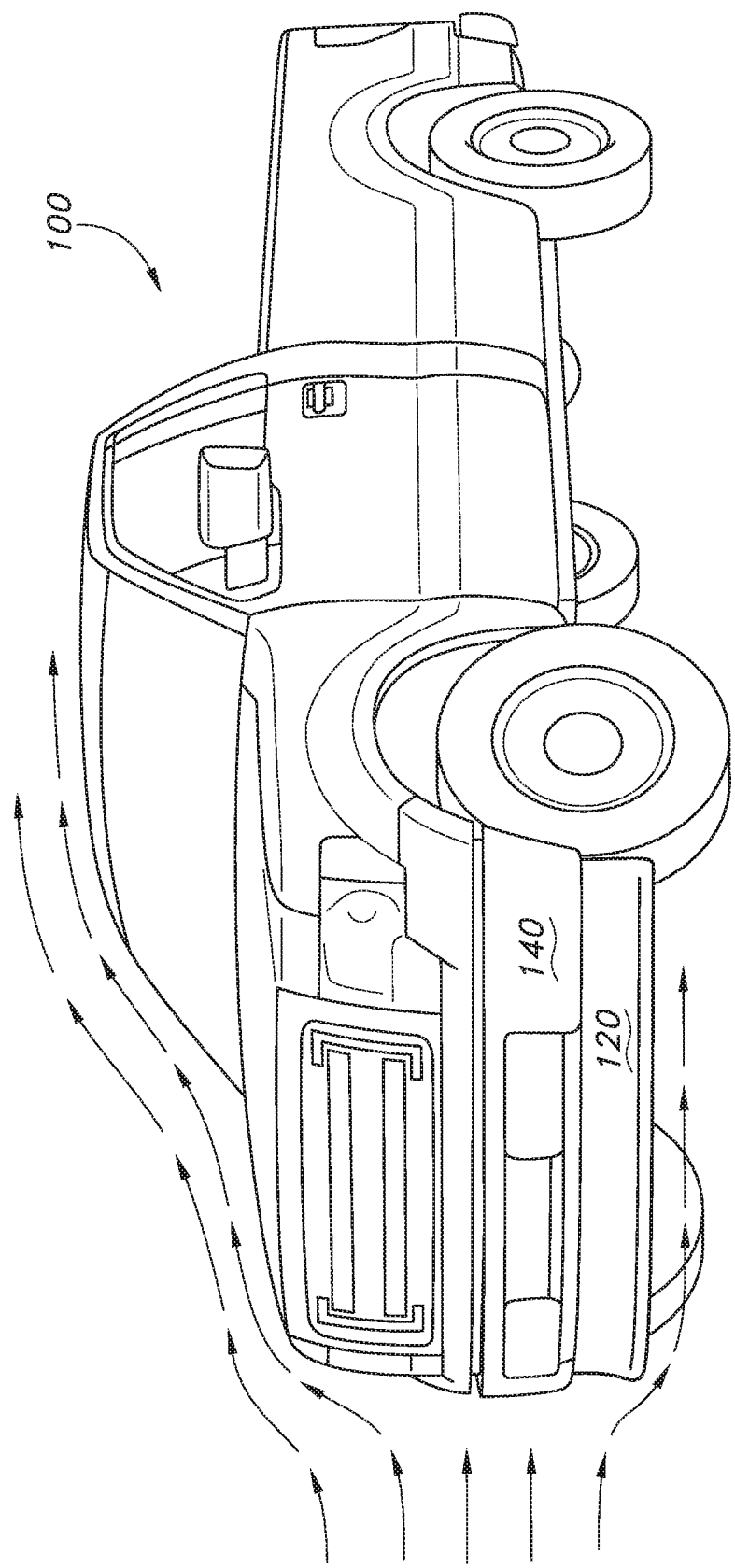
FIG. 1 shows a vehicle including a front air dam.

With reference to FIG. 1, as described above it is known to provide a motor vehicle 100 including a translatable aerodynamic front air deflector 120 disposed substantially adjacent and behind a vehicle bumper 140 and deployable downwardly from the vehicle to control airflow (see arrows) below the vehicle 100. The air dam 120 reduces airflow below the vehicle, thereby reducing the tendency of the nose of the vehicle to lift when traveling at speed. Likewise, by use of translatable air dams 120 having a variety of configurations, airflow below the vehicle can be increased or decreased as needed to assist in cooling underbody components.

Figure 2:
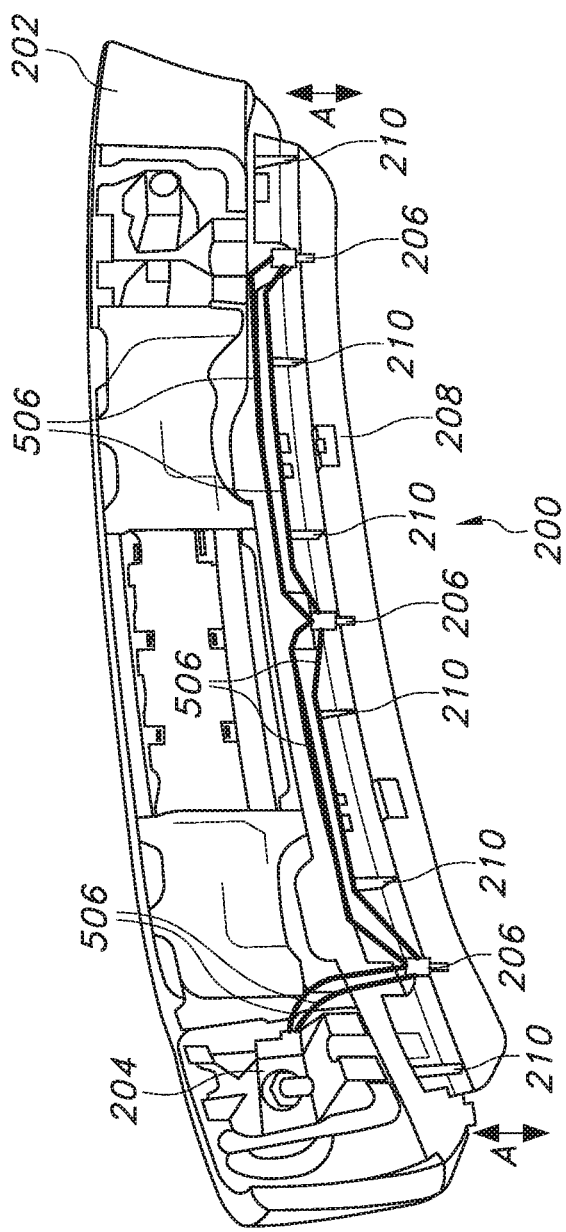
FIG. 2 shows an active air deflector according to the present disclosure.

However, such translatable air deflector systems can be unduly complex and costly. To solve this and other problems, with reference to FIG. 2 there is shown a vehicle air deflector assembly 200 according to the present disclosure, associated with a vehicle bumper 202. The assembly 200 includes a driver 204 configured to actuate a plurality of linear actuators 206 in series, i.e. as a unit, to vertically translate an air deflector 208 (arrows A).

Figure 3:
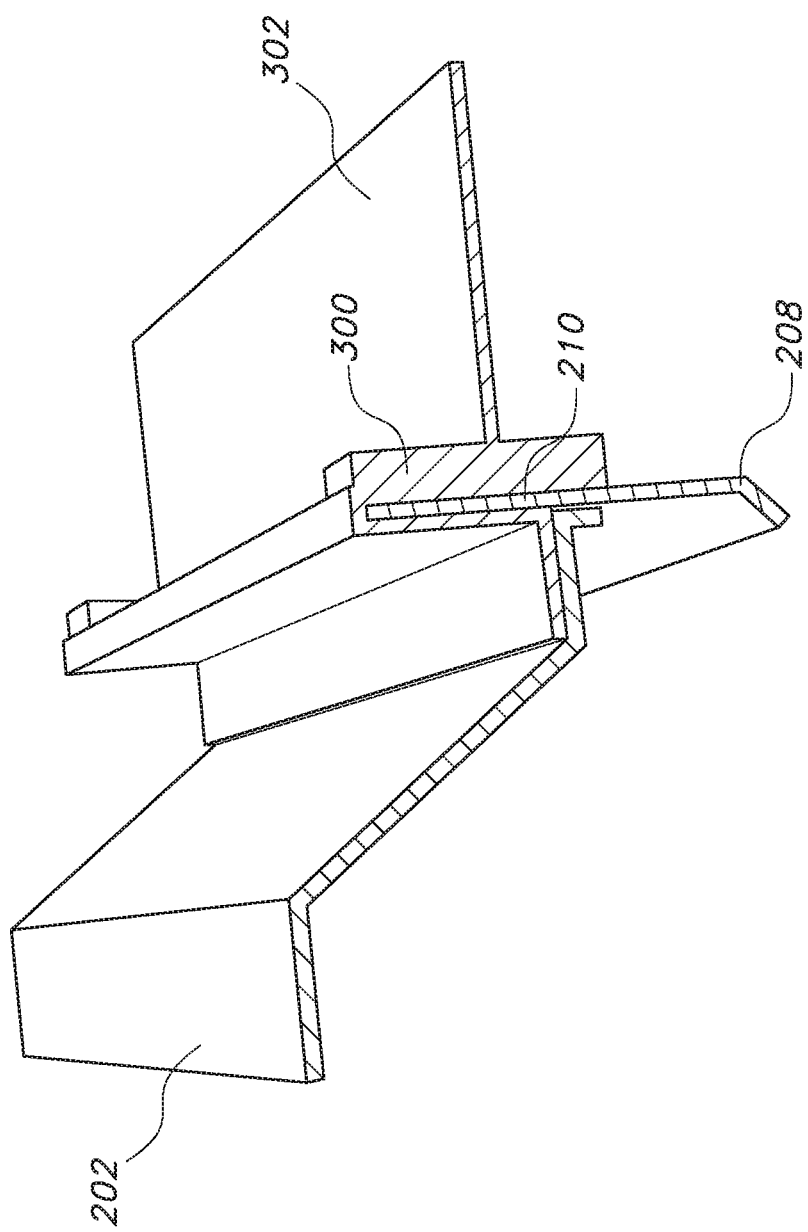
FIG. 3 shows in isolation an air deflector-mounted rail and cooperating vehicle-mounted track for the active air deflector if FIG. 2.

The air deflector is configured for vertical translation by one or more air deflector-mounted rails 210 configured to be slidingly received by one or more cooperating vehicle mounted tracks (not shown in this view). In an embodiment (see FIG. 3), the air deflector-mounted rails 210 are configured as T-channel sliders, and the vehicle-mounted tracks define cooperating female receivers therefore on a vehicle surface, for example cooperating tracks 300 associated with the vehicle belly pan 302. However, it will be appreciated that other configurations for rails 210 and tracks 300 are possible, and contemplated for use herein.

Figure 4:
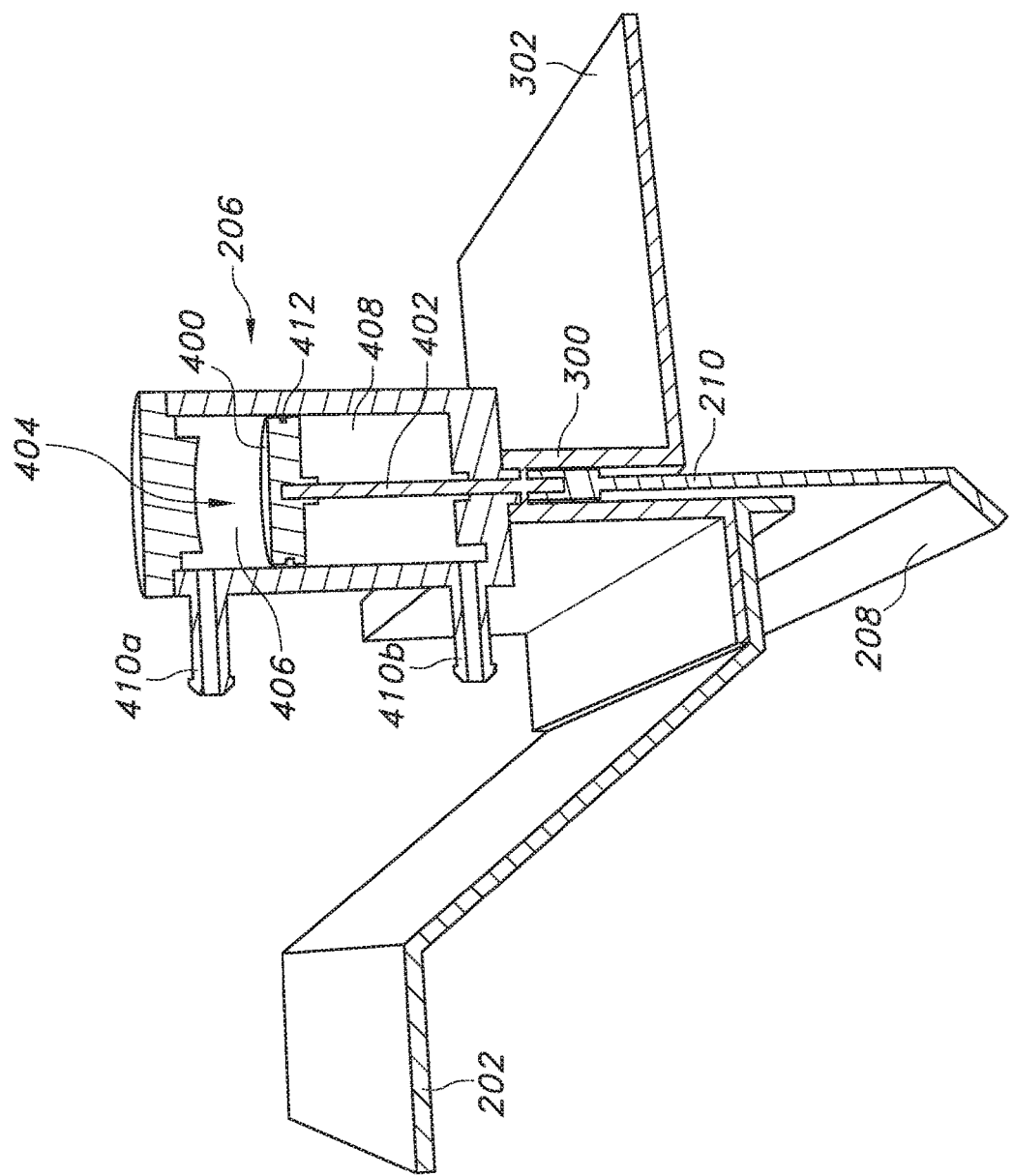
FIG. 4 shows a linear actuator for actuating the air deflector for vertical translation by the rail and cooperating track of FIG. 3.
Figure 5:
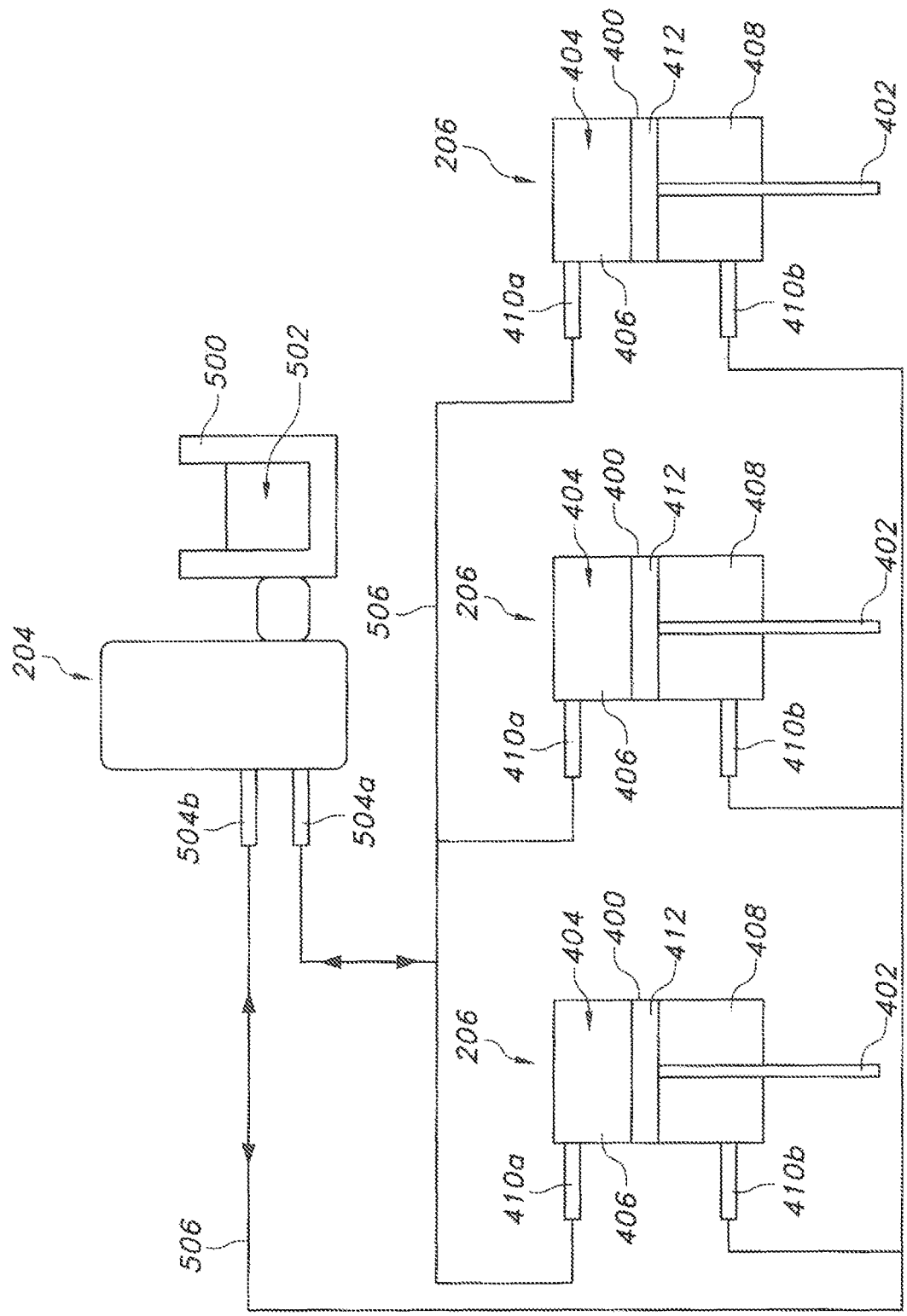
FIG. 5 is a schematic depiction of an airflow control assembly according to the present disclosure.

In an embodiment (see FIG. 4), each linear actuator 206 includes a piston head 400 coupled to a drive shaft 402 which in turn is operationally coupled to the air deflector 208. The piston head 400 is received in an interior chamber 404 such that an upper chamber 406 and a lower chamber 408 are defined. The upper chamber 406 includes an inlet 410a and the lower chamber 408 includes an inlet 410b, allowing placing the upper and lower chambers 406, 408 in fluid operational communication with the driver 204 (not shown in this view). As will be appreciated and further described below, supplying a driving fluid to the upper chamber 406 via inlet 410a will displace the piston head 400 downwardly, causing the air deflector 208 to deploy by likewise translating vertically downwardly. Conversely, supplying a driving fluid to the lower chamber 408 via inlet 410b will displace the piston head 400 upwardly, causing the air deflector 208 to retract by likewise translating vertically upwardly.

In embodiments, a distance traveled by the air deflector 208 when deploying is determined by a stroke length of the piston head 400/drive shaft 402.

The piston head 400 may include a seal 412 for controlling a fluid leakage between upper chamber 406 and lower chamber 408. In embodiments, a seal 412 is selected which allows a limited fluid leakage between upper chamber 406 and lower chamber 408, which as will be appreciated provides a self-bleeding function to remove air from the high pressure side of the piston head 400.

In the depicted embodiment, driver 204 is a fluid driver such as a reversible hydraulic pump supplied by a reservoir 500 with a suitable hydraulic fluid 502. As shown, the reversible hydraulic pump driver 204 includes two fluid outlets 504a, 504b. Fluid outlet 504a is in serial fluid communication with each actuator inlet 410a, and fluid outlet 504b is in serial fluid communication with each actuator inlet 410b, such as by suitable hoses 506. Thus, as will be appreciated the hydraulic pump 204 motor may be actuated in a first direction to supply fluid to hydraulic actuators upper chambers 406 to vertically translate piston head 400 and thereby air deflector 208 downwardly. By reversing the polarity of the motor, fluid is supplied to hydraulic actuators lower chambers 408 to vertically translate piston head 400 and thereby air deflector 208 upwardly.

Figure 6:
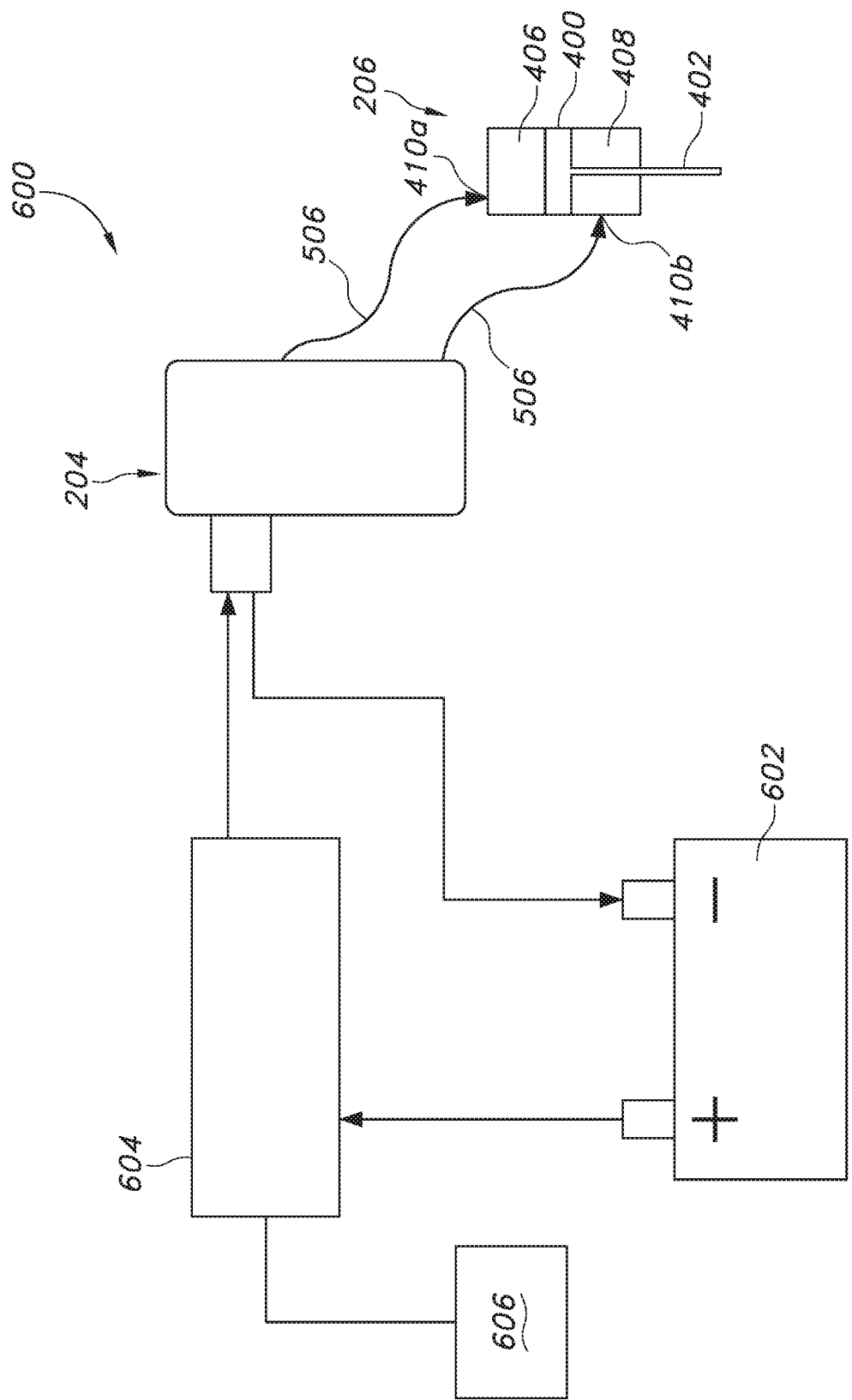
FIG. 6 is a schematic depiction of a control system for the airflow control assembly of FIG. 5.

A representative control system 600 is shown in FIG. 6. As shown, the system includes a power source 602 such as a vehicle battery, in electrical communication with the driver 204 and a controller 604. The controller may be any suitable existing or supplied controller or microcontroller. In the depicted embodiment, the controller 604 is the vehicle Body Control Module (BCM), which is already advantageously adapted and adaptable for controlling a variety of vehicle systems. As shown, the power source 602 and controller 604 are in electrical communication with the driver 204, for operating the driver reversibly as summarized above.

In turn, the controller 604 is provided with logic for controlling operation of the driver 204 according to a variety of inputs. The logic may include computer-executable instructions for operating the driver 204 in a first direction and in a second direction based on an input from a vehicle system 606. In the depicted embodiment of FIG. 6, the controller 604 is configured for receiving an input from the vehicle speedometer 606. At a high level, as the vehicle 100 reaches a predetermined speed, the controller 604 on receiving the input from the speedometer 606 that the predetermined speed has been reached or exceeded issues a signal to the driver 204 to perform a predetermined operation of actuating the linear actuators 206 to vertically translate the air deflector 208 (not shown in this view) as needed.

Figure 7:
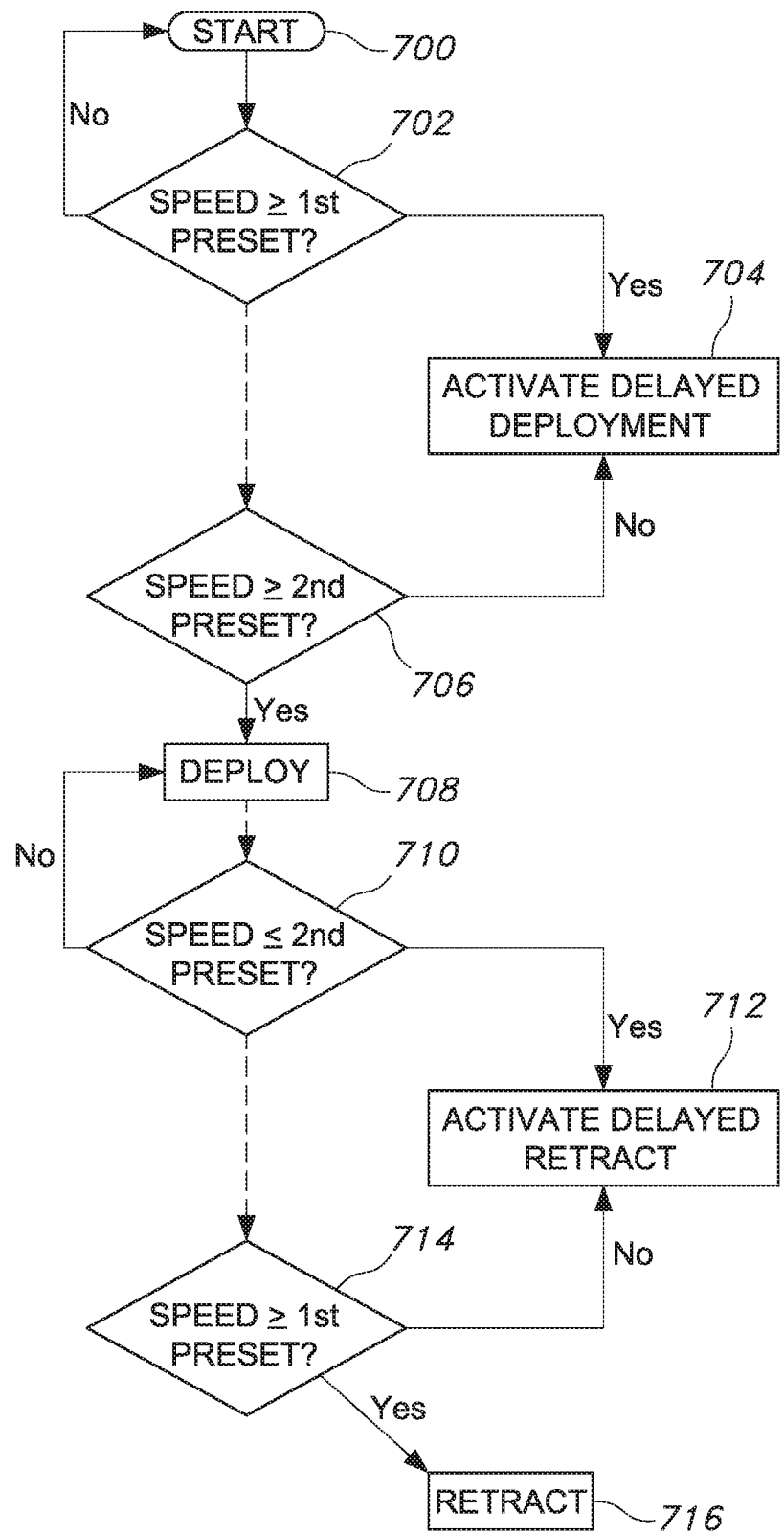
FIG. 7 is a flow chart depicting control logic for controlling the airflow control assembly of FIG. 5 via the control system of FIG. 6.

A representative control logic 700 flow is shown in FIG. 7. In the depicted example, deployment of the air deflector 208 is controlled by a vehicle 100 speed, and therefore the configuration of the control system 600 is substantially as depicted in FIG. 6. At a Start point (step 700), for example when the vehicle 100 motor is started, the system is activated. At step 702 a determination is made whether the vehicle 100 is traveling at a first preset speed, such as by input provided from the speedometer 606 to the controller 604. If so, at step 704 a command is issued leading to a delayed deployment of the air deflector 208, for example by initiating a 10 second timer included in the controller 604 logic. In one non-limiting example, the first preset speed could be 40 miles/hour, indicative that the vehicle is accelerating to a speed wherein deployment of an air dam 208 would be beneficial to fuel economy, motor cooling, etc.

In addition to or in place of step 704, logic 700 may include a step 706 of determining whether the vehicle 100 is traveling at a second preset speed, such as by input provided from the speedometer 606 to the controller 604. If not, the timer initiated at step 704 continues to run. If so, at step 708 a command is issued causing deployment of the air deflector 208. As will be appreciated, the deployment of air deflector 208 occurs by a command issued by controller 604 actuating driver 204 to supply fluid to first chambers 406 of linear actuators 206 via inlets 410a, thus causing deployment of air deflector 208 as described above. In one non-limiting example, the second preset speed could be 50 miles/hour, being a speed at which it has been determined that deployment of an air dam 208 would be beneficial to fuel economy, motor cooling, etc.

Likewise, the system 700 is configured to retract the air deflector 208 at need. In the embodiment depicted in FIG. 7, at step 710 a determination is made whether the vehicle 100 speed has decreased to at or below the second preset speed, again such as by input provided from the speedometer 606 to the controller 604. If not, the air deflector 208 remains deployed. If so, at step 712 a command is issued leading to a delayed retraction of the air deflector 208, for example by initiating a 10 second timer included in the controller 604 logic. Vehicle 100 speed decreasing to the second preset speed would serve as an indicator that the vehicle is approaching rough ground necessitating retraction of the air deflector 208, or that the vehicle is decelerating to a speed where deployment of the air deflector is not beneficial.

In addition to or in place of step 712, logic 700 may include a step 714 of determining whether the vehicle 100 speed has decreased to at or below the first preset speed, again such as by input provided from the speedometer 606 to the controller 604. If not, the timer initiated at step 712 continues to run. If so, at step 716 a command is issued causing retraction of the air deflector 208. As will be appreciated, the retraction of air deflector 208 occurs by a command issued by controller 604 actuating driver 204 to supply fluid to second chambers 408 of linear actuators 206 via inlets 410b, thus causing retraction of air deflector 208 as described above. Vehicle 100 speed decreasing to the first preset speed would serve as an indicator that the vehicle has encountered rough ground necessitating retraction of the air deflector 208. Alternatively, at the first preset speed it may have been determined that deployment of the air deflector is not beneficial.

Of course, the above parameters are presented as examples only, and are not to be taken as limiting. For example, the first and second preset speeds, the timer delays, etc. can be adjusted as needed in accordance with the vehicle type, capacity of the driver 204 and air deflector 208, and in accordance with other parameters.

Thus, by the above-described structures and mechanisms, an airflow control assembly and system are provided for raising and lowering of an air deflector in accordance with a vehicle speed and other parameters. The system is simple, robust, and efficient, requiring only a single driver 204 for operation and controllable from existing vehicle controllers provided input from existing vehicle systems such as the speedometer. Obvious modifications and variations are possible in light of the above teachings. All such modifications and variations are within the scope of the appended claims when interpreted in accordance with the breadth to which they are fairly, legally and equitably entitled.

What is claimed:

1. An airflow control system for a vehicle, comprising:
a vertically translatable air deflector;
a plurality of actuators actuated in series by a driver to vertically translate the air deflector; and
a controller operatively connected to the driver, the controller comprising logic including executable instructions to translate the air deflector to a predetermined position according to a vehicle rate of travel.

2. The system of claim 1, wherein the driver is a fluid driver.

3. The system of claim 1, wherein the air deflector comprises one or more rails configured for sliding translation within one or more cooperating vehicle-mounted tracks.

4. The system of claim 3, wherein the one or more rails are configured as T-channel sliders.

5. The system of claim 2, wherein the driver is a hydraulic pump.

6. The system of claim 5, wherein the hydraulic pump is reversible to cause the plurality of linear actuators to selectively raise or lower the air deflector.

7. The system of claim 6, wherein each of the plurality of linear actuators is a hydraulic piston, the plurality of linear actuators in combination with the hydraulic pump defining a reversible hydraulic circuit.

8. A vehicle including the system of claim 1.

9. An air deflector assembly for a vehicle, comprising:
a vertically translatable air deflector; and
a plurality of linear actuators actuated in series by a reversible hydraulic pump to vertically translate the air deflector.

10. The assembly of claim 9, further comprising a controller operatively connected to the reversible hydraulic pump;
wherein the controller comprises logic including executable instructions to translate the air deflector to a predetermined position according to a vehicle rate of travel.

* * * * *